(12) United States Patent
Liao et al.

(10) Patent No.: US 12,220,687 B2
(45) Date of Patent: Feb. 11, 2025

(54) IONIC LIQUID CATALYST

(71) Applicant: NAN YA PLASTICS CORPORATION, Taipei (TW)

(72) Inventors: Te-Chao Liao, Taipei (TW); Sen-Huang Hsu, Taipei (TW); Wei-Sheng Cheng, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 39 days.

(21) Appl. No.: 17/861,240

(22) Filed: Jul. 10, 2022

(65) Prior Publication Data

US 2023/0109033 A1  Apr. 6, 2023

(30) Foreign Application Priority Data

Oct. 1, 2021 (TW) .................................. 110136636

(51) Int. Cl.
*B01J 31/02* (2006.01)
(52) U.S. Cl.
CPC ................................ *B01J 31/0284* (2013.01)
(58) Field of Classification Search
None
See application file for complete search history.

(56) References Cited

U.S. PATENT DOCUMENTS

2009/0220767 A1* 9/2009 Schlogl .................. B01J 23/745
428/323
2018/0371206 A1* 12/2018 Castillo ................ B01J 35/1014

FOREIGN PATENT DOCUMENTS

| CN | 1061420 A | 5/1992 |
| CN | 102616881 A | 8/2012 |
| CN | 107406618 A | 11/2017 |
| CN | 107597124 A | 1/2018 |

* cited by examiner

*Primary Examiner* — Yun Qian
(74) *Attorney, Agent, or Firm* — Li & Cai Intellectual Property Office

(57) ABSTRACT

An ionic liquid catalyst and a method for manufacturing the same are provided. The ionic liquid catalyst includes a carrier. The carrier contains nickel ferrite as a component, and an outer surface of the carrier is modified to have a decolorant and a degradation agent. The decolorant is grafted onto nickel atoms of the carrier, and the degradation agent is grafted onto iron atoms of the carrier. The method includes: providing the carrier that contains nickel ferrite as a component; and modifying the carrier, so that the nickel atoms of the carrier are grafted with the decolorant and the iron atoms of the carrier are grafted with the degradation agent. Accordingly, the ionic liquid catalyst is obtained.

11 Claims, 6 Drawing Sheets

IONIC LIQUID CATALYST

CROSS-REFERENCE TO RELATED PATENT APPLICATION

This application claims the benefit of priority to Taiwan Patent Application No. 110136636, filed on Oct. 1, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an ionic liquid catalyst and a method for manufacturing the same, and more particularly to an ionic liquid catalyst that has decolorizing and degrading effects and a method for manufacturing the same.

BACKGROUND OF THE DISCLOSURE

Nowadays, with the rise of environmental awareness, recycling and reusing of industrial and domestic waste has not only become an important issue, but also brings along far-reaching business opportunities. In particular, a vast majority of the domestic waste is plastic products made from polyethylene terephthalate (PET).

To reduce the amount of plastic waste, closed-loop chemical recycling techniques have been developed, such as a solvent-assisted chemical degradation, a biological degradation, or a microwave-assisted chemical degradation. In response to an ever-increasing population and decreasing resources, the closed-loop chemical recycling techniques focus on sustainability of supply chains, and aim to manufacture products without producing unrecyclable waste.

Fiber cloth makes up a substantial portion of recyclable plastic products. During a recycling process of the fiber cloth, how a dye can be effectively removed from the fiber cloth is still an important issue to be solved. If the dye cannot be completely removed, the fiber cloth cannot undergo a subsequent purification process.

To remove the dye on the fiber cloth, extracted solvents and catalysts are conventionally added for extraction. In the conventional technology, an amount of relevant literature associated with enhancement of an extraction effect has also been provided, in which a specific solvent is selected or a specific extraction method is adopted.

After a decolorization process, the fiber cloth undergoes a degradation treatment, so as to receive a monomer mixture. Then, foreign matter or impurities in the monomer mixture are removed therefrom for the purpose of purification. Afterwards, the purified monomer mixture is once again polymerized to obtain a recycled PET.

However, during the above-mentioned processes of decolorization and degradation, different catalysts are added to expedite decolorization or degradation reactions. In addition, before the next step is taken, the catalyst that is used in the previous step needs to be separated. In view of this, the entire process of treating the fiber cloth can be time-consuming and is unfavorable for a continuous treatment. Therefore, new alternatives are needed to improve upon the conventional technology.

SUMMARY OF THE DISCLOSURE

In response to the above-referenced technical inadequacies, the present disclosure provides an ionic liquid catalyst and a method for manufacturing the same.

In one aspect, the present disclosure provides an ionic liquid catalyst. The ionic liquid catalyst includes a carrier. The carrier contains nickel ferrite as a component, and an outer surface of the carrier is modified to have a decolorant and a degradation agent. The decolorant is grafted onto nickel atoms of the carrier, and the degradation agent is grafted onto iron atoms of the carrier.

In certain embodiments, the decolorant contains a carbon material as a component.

In certain embodiments, a weight ratio of the carbon material to the carrier is from 0.01 to 0.05.

In certain embodiments, the decolorant is a solid carbon fiber tube.

In certain embodiments, the degradation agent includes an ionic liquid.

In certain embodiments, a weight ratio of the ionic liquid to the carrier is from 2 to 4.5.

In certain embodiments, the ionic liquid is a pyrimidine compound, a pyridine compound, a pyrazole compound, a piperidine compound, an imidazole compound, or any combination thereof.

In certain embodiments, the degradation agent is connected to the iron atoms of the carrier through a bridging structure.

In certain embodiments, a size of the carrier is less than or equal to 100 nm.

In another aspect, the present disclosure provides a method for manufacturing an ionic liquid catalyst. The method includes the following steps: providing a carrier, in which the carrier contains nickel ferrite as a component; and surface modifying the carrier, in which a decolorant is grafted onto nickel atoms of the carrier and a degradation agent is grafted onto iron atoms of the carrier, so as to obtain the ionic liquid catalyst.

In certain embodiments, the decolorant is grafted onto the nickel atoms of the carrier to obtain a composite powder material, and then the degradation agent is grafted onto the iron atoms of the carrier, so as to obtain the ionic liquid catalyst.

In certain embodiments, the decolorant contains a carbon material as a component.

In certain embodiments, steps of grafting the decolorant include: introducing carbon dioxide at a temperature from 400° C. to 800° C., and reducing and grafting the carbon dioxide onto the nickel atoms of the carrier, so as to obtain the composite powder material.

In certain embodiments, the composite powder material is thermally treated at a temperature from 500° C. to 800° C.

In certain embodiments, the degradation agent contains an ionic liquid as a component.

In certain embodiments, a siloxane is grafted onto the iron atoms of the carrier to form a bridging structure, and then the ionic liquid reacts with the bridging structure, so that the ionic liquid is grafted onto the iron atoms of the carrier through the bridging structure.

In certain embodiments, the ionic liquid reacts with the siloxane to form an intermediate, and then the intermediate reacts with the carrier, so that the ionic liquid is grafted onto the iron atoms of the carrier through the siloxane.

Therefore, in the ionic liquid catalyst and the method for manufacturing the same provided by the present disclosure, by virtue of "the decolorant being grafted onto nickel atoms of the carrier" and "the degradation agent being grafted onto iron atoms of the carrier," the objective of enhancing a decolorizing effect and a degrading effect can be achieved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
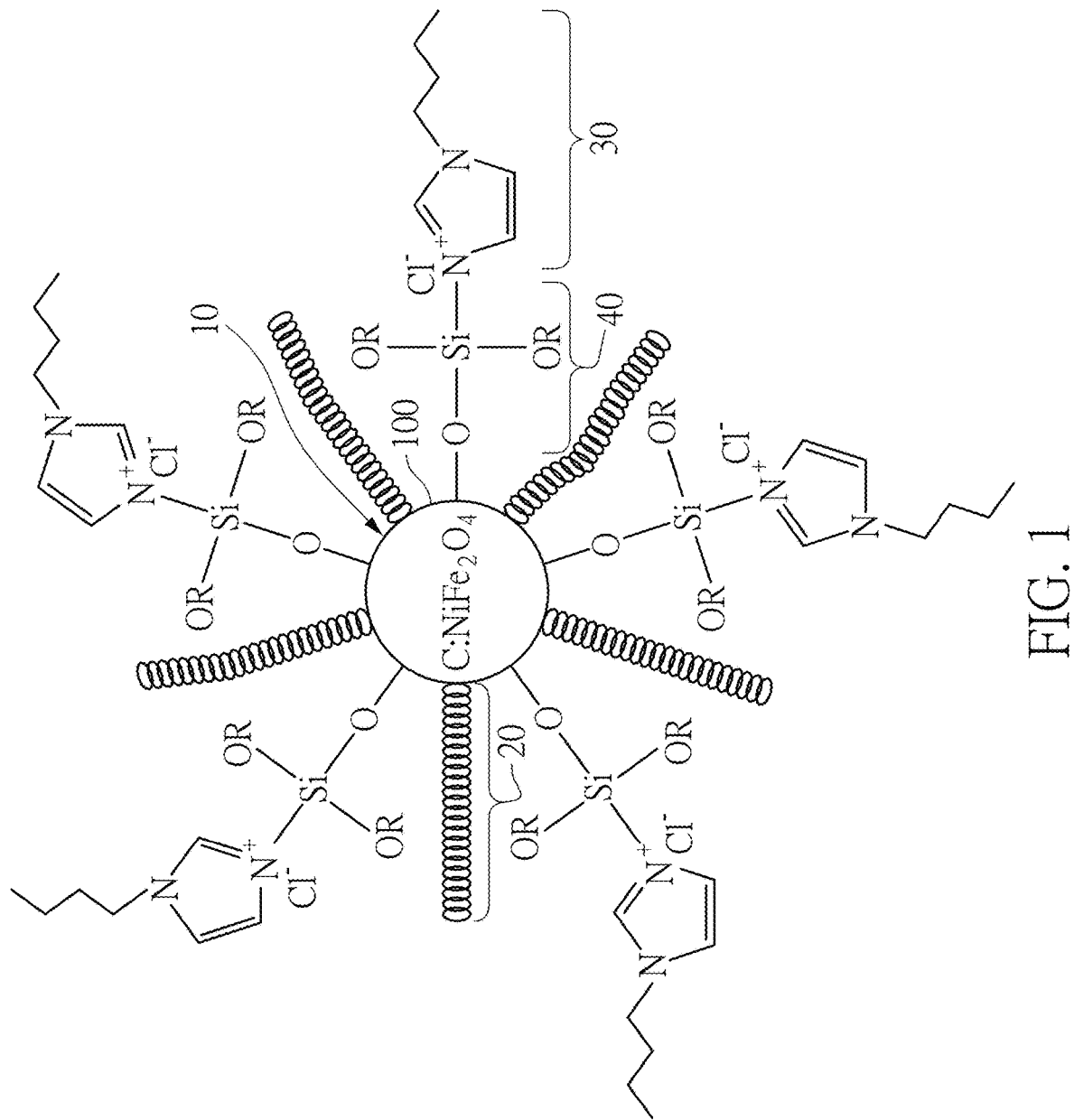
FIG. 1 is a schematic diagram of an ionic liquid catalyst according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides an ionic liquid catalyst, which has the function of decolorization and degradation. Accordingly, the ionic liquid catalyst of the present disclosure is particularly applicable for processing plastic textile waste. Due to having decolorizing and degrading effects, when the ionic liquid catalyst is used to process the plastic textile waste, a more convenient manufacturing process can be adopted to achieve the effect of recycling the plastic textile waste.

As shown in FIG. 1, the ionic liquid catalyst of the present disclosure includes a carrier 10. An outer surface 100 of the carrier 10 is grafted with a decolorant 20 and a degradation agent 30. As such, the ionic liquid catalyst of the present disclosure is capable of enhancing the decolorizing effect and the degrading effect.

The carrier 10 contains nickel ferrite ($NiFe_2O_4$) as a component. The carrier 10 can have a spherical shape or other irregular shapes. The shape of the carrier 10 can be further adjusted according to practical requirements (e.g., a surface area). The carrier 10 can be micrometer-scale or nanometer-scale in size.

In one exemplary embodiment, the size of the carrier 10 is nanometer-scale. When the carrier 10 is nanometer-scale, a space between the carrier 10 and the degradation agent 30 grafted onto the carrier 10 is also of a nanometer size. The space can assist in adsorption of a dye, so as to enhance the decolorizing effect of the ionic liquid catalyst. Accordingly, the carrier 10 of the nanometer size allows the ionic liquid catalyst to have an improved decolorizing effect. Specifically, the size of the carrier 10 is less than or equal to 500 nm. Preferably, the size of the carrier 10 is less than or equal to 300 nm. More preferably, the size of the carrier 10 is less than or equal to 200 nm. Even more preferably, the size of the carrier 10 is less than or equal to 100 nm.

The decolorant 20 can be grafted onto the outer surface 100 of the carrier 10 in an adsorption manner or a bonding manner. Specifically, the decolorant 20 is grafted into nickel atoms of the carrier 10. When the ionic liquid catalyst is in contact with the plastic textile waste, the dye on the plastic textile waste can be adsorbed by the decolorant 20, thereby achieving the decolorizing effect.

In one exemplary embodiment, the decolorant 20 contains a carbon material as a component. For example, the carbon material can be graphite, graphene, graphene oxide, carbon nanotubes, carbon black, or activated carbon. However, the present disclosure is not limited thereto. Based on a total weight of the carrier 10, a weight ratio of the decolorant 20 to the carrier 10 is from 0.01 to 0.05. In addition, the decolorant 20 can be a solid carbon fiber tube made from the carbon material. The solid carbon fiber tube extends outwardly from the outer surface 100 of the carrier 10, and the solid carbon fiber tube is formed by having multiple graphite layers stacked upon the outer surface 100 of the carrier 10 in a parallel manner. An actual structure of the solid carbon fiber tube will be illustrated in detail below.

To achieve an improved decolorizing effect, a weight ratio of the carbon material to the carrier 10 is from 0.01 to 0.04. Preferably, the weight ratio of the carbon material to the carrier 10 is from 0.01 to 0.035. More preferably, the weight ratio of the carbon material to the carrier 10 is from 0.01 to 0.03. However, the present disclosure is not limited thereto.

The degradation agent 30 can be grafted onto the outer surface 100 of the carrier 10 in an adsorption manner or a bonding manner. Specifically, the degradation agent 30 is grafted onto iron atoms of the carrier 10. When the ionic liquid catalyst is in contact with the plastic textile waste, the degradation agent 30 can help degrade the plastic textile waste, such that the degrading effect is achieved.

In one exemplary embodiment, the degradation agent 30 includes an ionic liquid. The ionic liquid refers to an ionic compound in a liquid form. The ionic liquid usually has a low melting point, and is formed by ions having electric charges and ion pairs that exist temporarily. The ionic liquid can be an ionic compound having positive electric charges, but can also be an ionic compound having negative electric charges. In one exemplary embodiment, the ionic liquid is the ionic compound having positive electric charges. Based on the total weight of the carrier 10, a weight ratio of the ionic liquid to the carrier 10 is greater than or equal to 1.8.

When the ionic liquid is the ionic compound having positive electric charges, cations that provide positive electric charges can be imidazole ions, pyridine ions, quaternary phosphonium ions, quaternary ammonium ions, guanidinium ions, sulfonium ions, choline ions, or morpholinium ions.

In one exemplary embodiment, the weight ratio of the ionic liquid to the carrier 10 is from 2 to 4.5. Preferably, the weight ratio of the ionic liquid to the carrier 10 is from 2 to 4. More preferably, the weight ratio of the ionic liquid to the carrier 10 is from 2 to 3.5. However, the present disclosure is not limited thereto.

To be specific, the ionic liquid can be an aromatic heterocyclic compound, such as a pyrimidine compound, a pyridine compound, a pyrazole compound, a piperidine compound, an imidazole compound, or any combination thereof. However, the present disclosure is not limited thereto.

In some embodiments, the aromatic heterocyclic compound can include one or more alkyl groups having a carbon number of 1 to 5. For example, the ionic liquid can be an imidazole compound that includes one or more alkyl groups having a carbon number of 1 to 5 (such as 1-butylimidazole and 1-butyl-3-methylimidazolium). However, the present disclosure is not limited thereto. The type of the ionic liquid can be selected according to material types of the plastic textile waste.

In some embodiments, the ionic liquid catalyst further includes a bridging structure 40. The degradation agent 30 is grafted onto the outer surface 100 of the carrier 10 through the bridging structure 40. One end of the bridging structure 40 is connected to the iron atoms the carrier 10, and another end of the bridging structure 40 is connected to the ionic liquid. In this way, the ionic liquid can be grafted onto the iron atoms of the carrier 10.

In some embodiments, the bridging structure 40 is formed by a siloxane having a low molecular weight. A weight-average molecular weight of the bridging structure 40 is from 100 to 500. Preferably, the weight-average molecular weight of the bridging structure 40 is from 100 to 300. To be specific, the bridging structure 40 is formed by a halogen-containing siloxane, and the degradation agent 30 is connected to the iron atoms of the carrier 10 through the halogen-containing siloxane. For example, the bridging structure 40 can be formed by a chlorine-containing siloxane, or the bridging structure 40 can be formed by a bromine-containing siloxane.

In certain exemplary embodiments, the bridging structure 40 is formed by the chlorine-containing siloxane with a low carbon number. The chlorine-containing siloxane with a low carbon number is represented by formula (I). In the formula (I), each of $R^1$, $R^2$, and $R^3$ is independent from one another, and is an alkyl group having a carbon number of 1 to 4. The bromine-containing siloxane with a low carbon number is represented by formula (II). In the formula (II), each of $R^1$, $R^2$, and $R^3$ is independent from one another, and is an alkyl group having a carbon number of 1 to 4. However, the present disclosure is not limited thereto.

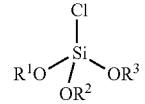

Formula (I)

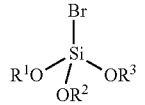

Formula (II)

In the present disclosure, a method for manufacturing the ionic liquid catalyst includes the following steps: providing the carrier 10 that contains nickel ferrite as a component; and modifying the carrier 10, so that the nickel atoms of the carrier 10 are grafted with the decolorant 20 and the iron atoms of the carrier 10 are grafted with the degradation agent 30.

The sequence for grafting the decolorant 20 and the degradation agent 30 is not limited in the present disclosure. That is, the decolorant 20 can first be grafted onto the carrier 10, and then the degradation agent 30 is grafted onto the carrier 10. Or, the degradation agent 30 can first be grafted onto the carrier 10, and then the decolorant 20 is grafted onto the carrier 10. In one exemplary embodiment, the decolorant 20 is first grafted onto the carrier 10, and then the degradation agent 30 is grafted onto the carrier 10.

Figure 2:
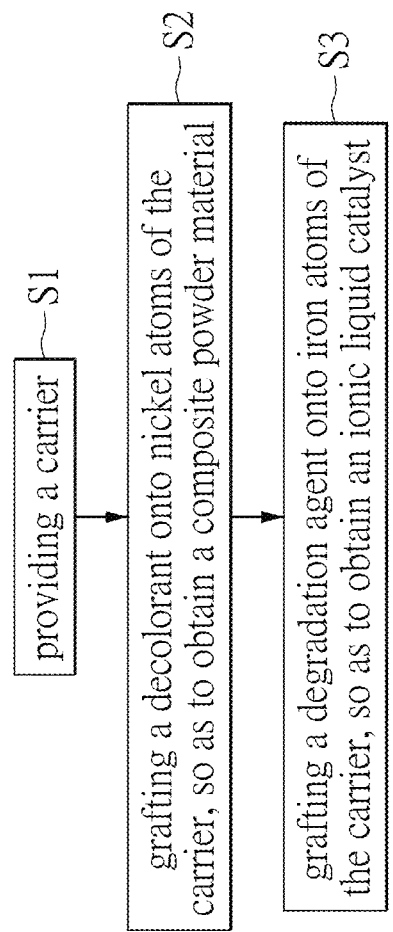
FIG. 2 is a flowchart illustrating steps in a method for manufacturing the ionic liquid catalyst according to the present disclosure.

As shown in FIG. 2, the method for manufacturing the ionic liquid catalyst in the present disclosure includes steps as follows: providing a carrier (step S1), in which the carrier contains nickel ferrite as a component; grafting a decolorant onto nickel atoms of the carrier, so as to obtain a composite powder material (step S2); and grafting a degradation agent onto iron atoms of the carrier, so as to obtain the ionic liquid catalyst (step S3).

Figure 3:
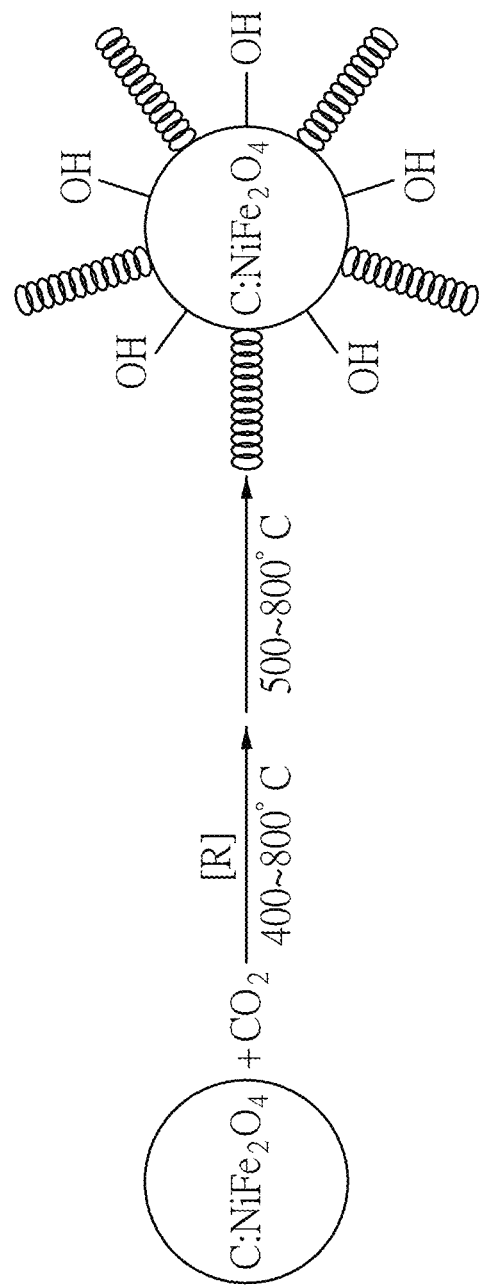
FIG. 3 is a diagram showing a reaction process of step S2 in the method for manufacturing the ionic liquid catalyst according to the present disclosure.

Reference is made to FIG. 3, which is a diagram showing a reaction process of step S2. In step S2, in order to graft the decolorant onto the carrier, carbon dioxide is used as a raw material in the present disclosure. Further, the carbon dioxide is reduced and deposited on the carrier, so that the decolorant is grafted onto the carrier.

Specifically, through fixed bed reduction, the carbon dioxide and the carrier are reacted for 2 to 36 hours at a temperature from 400° C. to 800° C. in the present disclosure. After the carbon dioxide is reduced back to the carbon material, the carbon dioxide can be grafted onto the nickel atoms of the carrier, so as to complete the composite powder material ($C:NiFe_2O_4$). It should be noted that in the above-mentioned carbon dioxide reduction process, the iron atoms on a surface of the carrier can also be reduced and form some hydroxyl groups (as shown in FIG. 3).

After the decolorant is grafted, the composite powder material can be thermally treated at a temperature from 500° C. to 800° C. for 1 to 2 hours. In this way, a lattice of the composite powder material will be rearranged, thereby having more stability.

Figure 4:
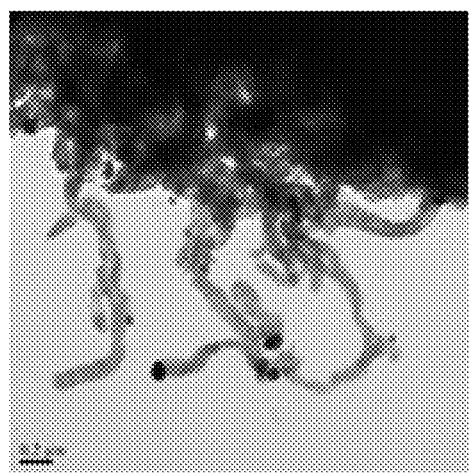
FIG. 4 is a scanning electron microscope image of a carrier and a decolorant during step S3.
Figure 5:
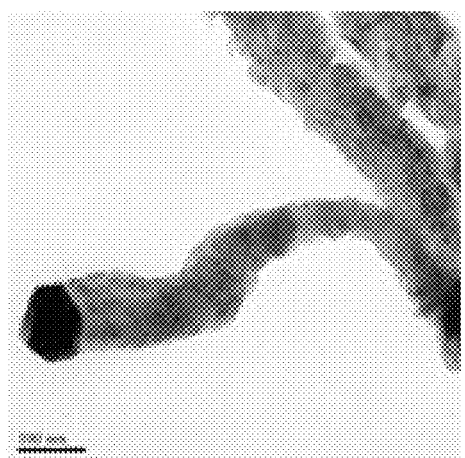
FIG. 5 is a partial enlarged view of a region in FIG. 4.
Figure 6:
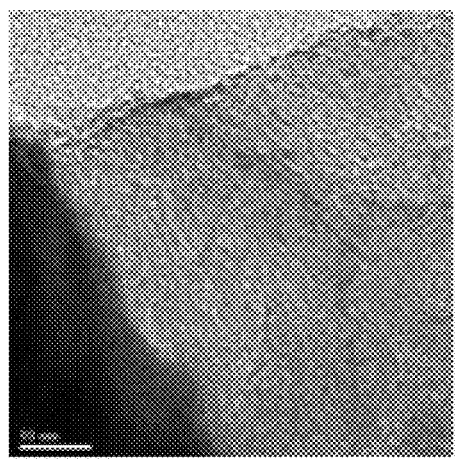
FIG. 6 is a partial enlarged view of a region in FIG. 5.

Reference is made to FIG. 4 to FIG. 6, which are scanning electron microscope (SEM) images of the composite powder material in the present disclosure. It can be observed from FIG. 4 to FIG. 6 that the decolorant is grafted onto an outer surface of the carrier, and is formed by extending outwardly from the outer surface of the carrier. The decolorant takes the form of the solid carbon fiber tube. Specifically, the carbon material is formed into the shape of the solid carbon fiber tube by having thin-layer structural units stacked upon the outer surface of the carrier in a parallel manner. Further, an axial direction of the solid carbon fiber tube is perpendicular to the outer surface of the carrier.

Figure 7A:
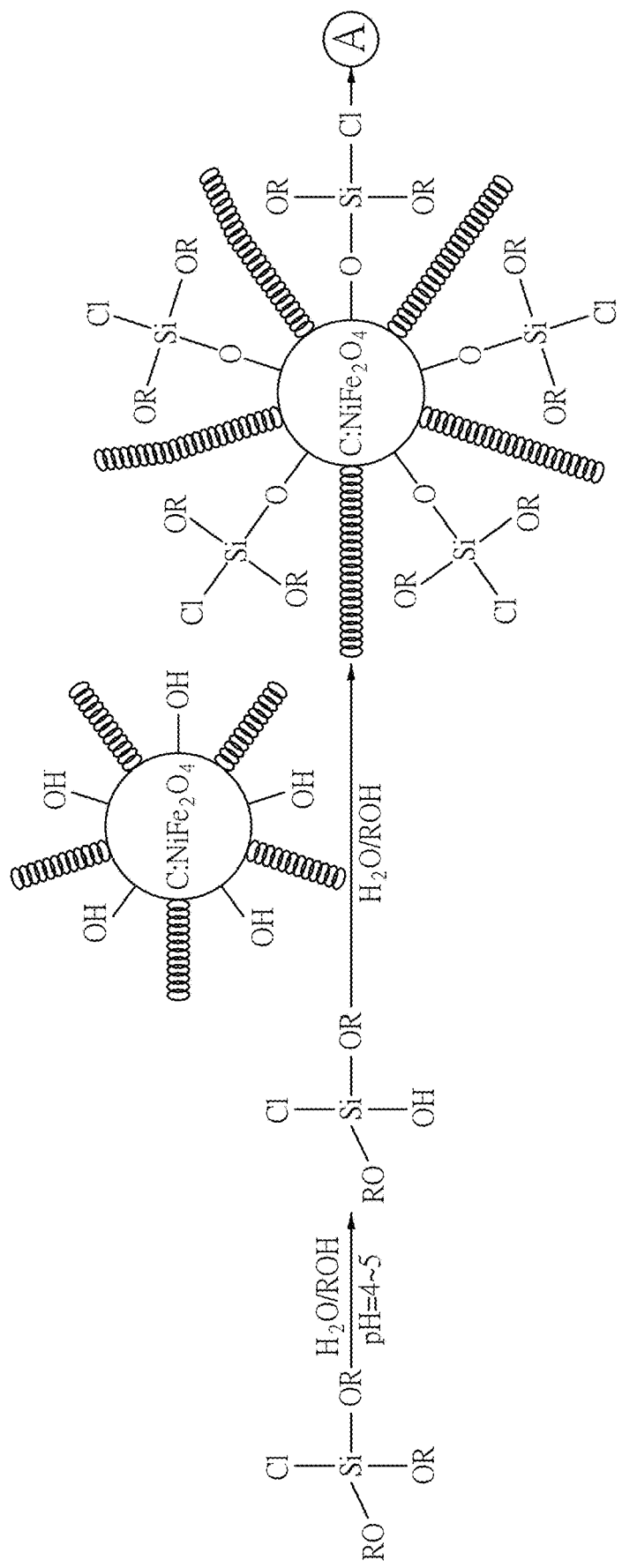
FIG. 7A and FIG. 7B are each a diagram showing a reaction process of step S3 in the method for manufacturing the ionic liquid catalyst according to the present disclosure.
Figure 7B:
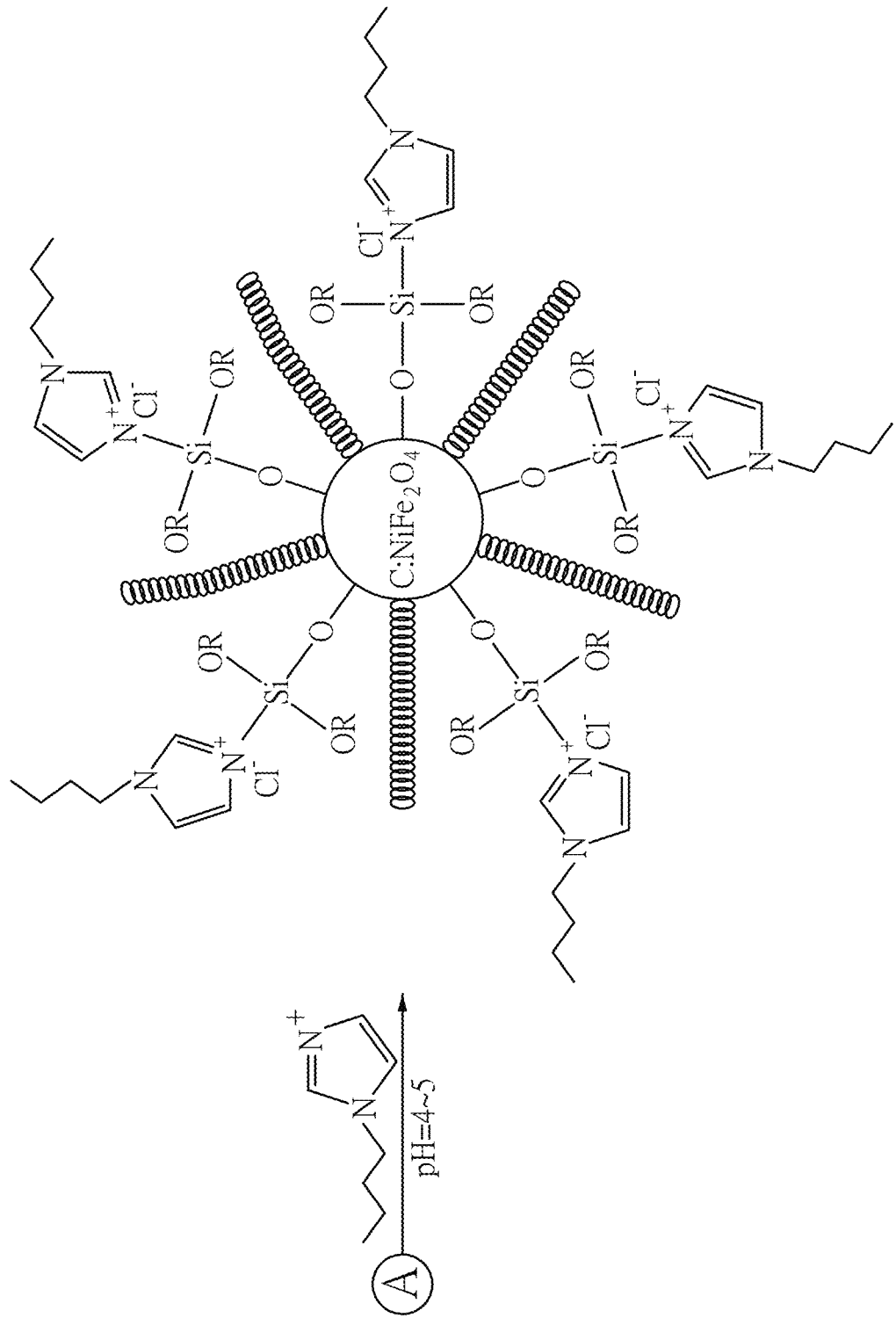

Reference is made to FIG. 7A and FIG. 7B, each of which is a diagram showing a reaction process of step S3. In step S3, the chlorine-containing siloxane (i.e. a bridging structure) is reduced in an acidic environment (pH=4 to 5) and has a hydroxyl group. Next, the reduced chlorine-containing siloxane has a reaction with the composite powder material in step S2, and the chlorine-containing siloxane is grafted onto the composite powder material through the hydroxyl group. To be specific, the chlorine-containing siloxane is grafted onto the iron atoms of the carrier. Then, 1-butylimidazole (i.e., the ionic liquid) is added in the acidic environment (pH=4 to 5), and reacts with chloro in the chlorine-containing siloxane, so as to be grafted onto the bridging structure. Accordingly, the degradation agent can be grafted onto the composite powder material through the bridging structure, and the ionic liquid catalyst of the present disclosure can be manufactured.

Apart from the reaction processes shown in FIG. 7A and FIG. 7B, the 1-butylimidazole (i.e., the ionic liquid) can first react with the chlorine-containing siloxane, so as to form an intermediate that includes the ionic liquid. Then, the intermediate reacts with the composite powder material in step S2. Accordingly, the degradation agent can also be grafted onto the composite powder material through the bridging structure.

To prove the advantages of the ionic liquid catalyst of the present disclosure, ionic liquid catalysts of Examples 1 to 4 are prepared according to the reaction processes illustrated in FIG. 3, FIG. 7A, and FIG. 7B. That is, the nickel ferrite is used as the carrier, the carbon material obtained by reduction of the carbon dioxide is used as the decolorant, and the ionic liquid that uses the bridging structure for connection is used as the degradation agent. Specific components of Examples 1 to 4 and their contents are listed in Table 1. In Table 1, a carbon material content ratio refers to a weight ratio of the carbon material to the carrier. When the carbon material content ratio is 0.5%, the weight ratio of the carbon material to the carrier is 0.005.

TABLE 1

Components of ionic liquid catalysts and their contents

| | Carbon material content ratio (%) | Weight of carrier (g) | Added amount of ionic liquid (g) |
|---|---|---|---|
| Example 1 | 0.5 | 1 | 2.8 |
| Example 2 | 1 | 1 | 2.8 |
| Example 3 | 3 | 1 | 2.8 |
| Example 4 | 3 | 1 | 3.6 |

An appropriate amount of the ionic liquid catalyst of each of Examples 1 to 4 is taken, and is then added into ethylene glycol and a discarded PET fiber cloth. Based on a total weight of the ethylene glycol and the discarded PET fiber cloth, an added amount of the ionic liquid catalyst is 0.2 wt %. With heating and stirring performed at a temperature from 180° C. to 220° C., the ethylene glycol and the discarded PET fiber cloth undergo decolorization and degradation reactions. After said reactions, a monomer mixture that has been decolorized and degraded can be obtained. The monomer mixture contains bis(2-hydroxyethyl) terephthalate (BHET) as a component. The bis(2-hydroxyethyl) terephthalate is a monomer formed after polyethylene terephthalate is degraded.

A reaction time for decolorization and degradation, a degradation efficiency, and a hue value of the monomer mixture are listed in Table 2. The degradation efficiency refers to a percentage of a number of monomer moles actually generated during the degradation divided by a number of monomer moles theoretically generated during the degradation.

TABLE 2

| | Decolorization/ degradation reactions Reaction time (h) | Degradation efficiency (%) | Hues of monomer mixture | | |
|---|---|---|---|---|---|
| | | | L | a | b |
| Example 1 | 3 | 91 | 78 | 2.4 | 16.5 |
| Example 2 | 2 | 93 | 80 | 0.16 | 6.46 |
| Example 3 | 2 | 83 | 83 | −0.65 | 5.7 |
| Example 4 | <2 | 93 | 85 | −0.73 | 4.1 |

From results of Table 1 and Table 2, the ionic liquid catalyst of the present disclosure can have an improved decolorizing effect through the decolorant (i.e., the carbon material) on the carrier, and can have an improved degrading effect through the degradation agent (i.e., the ionic liquid) on the carrier. Therefore, the ionic liquid catalyst of the present disclosure can enhance the effects of the decolorization and degradation reactions at the same time.

A comparison can be made between the results of Example 1 and Examples 2 to 4. When the carbon material content ratio is greater than 0.5%, the degraded monomer mixture can have a whiter hue, and meets a certain appearance standard. Specifically, after the decolorization, an L value of the monomer mixture is greater than 80, and a value of the monomer mixture is between 1 and −1, and a b value of the monomer mixture is between 6.5 and −6.5.

In the present disclosure, the weight ratio of the carbon material to the carrier is greater than 0.005 to 0.05. Preferably, the weight ratio of the carbon material to the carrier is from 0.01 to 0.04. More preferably, the weight ratio of the carbon material to the carrier is from 0.01 to 0.035.

A comparison can be made between the results of Example 3 and Example 4. When a weight ratio of an added amount of the ionic liquid to the carrier is greater than 2.8 (preferably, the weight ratio of the added amount of the ionic liquid to the carrier is from 3 to 4), a higher degradation efficiency can be achieved within a shorter period of time.

In one exemplary embodiment, a weight ratio of the ionic liquid to the carrier is greater than 2.8 to 4.5. Preferably, the weight ratio of the ionic liquid to the carrier is from 3 to 4. More preferably, the weight ratio of the ionic liquid to the carrier is from 3.2 to 3.5.

A comparison can be made between the results of Example 2 and Example 3. When the weight ratio of the carbon material to the carrier is higher, the degradation efficiency of the ionic liquid catalyst is slightly reduced. Accordingly, in the present disclosure, the weight ratio of the carbon material to the carrier and the weight ratio of the ionic liquid to the carrier are simultaneously controlled, so as to allow the ionic liquid catalyst to have improved decolorizing and degrading effects.

In one exemplary embodiment, the weight ratio of the carbon material to the carrier is greater than 0.005, and the weight ratio of the ionic liquid to the carrier is greater than or equal to 2.8. Preferably, the weight ratio of the carbon material to the carrier is greater than 0.008, and the weight ratio of the ionic liquid to the carrier is greater than or equal to 2.9.

[Beneficial Effects of the Embodiments]

In conclusion, in the ionic liquid catalyst and the method for manufacturing the same provided by the present disclosure, by virtue of "the decolorant being grafted onto nickel atoms of the carrier" and "the degradation agent being grafted onto iron atoms of the carrier," the objective of enhancing the decolorizing effect and the degrading effect can be achieved.

To be more specific, by virtue of "a weight ratio of the carbon material to the carrier being from 0.01 to 0.05," the ionic liquid catalyst of the present disclosure has an improved decolorizing effect.

To be more specific, by virtue of "a weight ratio of the ionic liquid to the carrier being from 2 to 4.5," the ionic liquid catalyst of the present disclosure has an improved degrading effect.

To be more specific, by virtue of "a size of the carrier being less than or equal to 100 nm," the ionic liquid catalyst of the present disclosure has an improved decolorizing effect.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An ionic liquid catalyst, comprising:
a carrier having a size being less than or equal to 100 nm, wherein the carrier contains nickel ferrite as a component, and an outer surface of the carrier is modified to have a decolorant and a degradation agent; wherein the decolorant is stacked upon and grafted onto nickel atoms of the carrier and extends outwardly in a parallel manner to form a solid carbon fiber tube, wherein the degradation agent comprising an ionic liquid, and the degradation agent is grafted onto iron atoms of the carrier.

2. The ionic liquid catalyst according to claim 1, wherein a weight ratio of the decolorant to the carrier is from 0.01 to 0.05.

3. The ionic liquid catalyst according to claim 1, wherein a weight ratio of the ionic liquid to the carrier is from 2 to 4.5.

4. The ionic liquid catalyst according to claim 1, wherein the ionic liquid is a pyrimidine compound, a pyridine compound, a pyrazole compound, a piperidine compound, an imidazole compound, or any combination thereof.

5. The ionic liquid catalyst according to claim 1, wherein the degradation agent is connected to the iron atoms of the carrier through a bridging structure.

6. A method for manufacturing an ionic liquid catalyst, comprising:
providing a carrier having a size being less than or equal to 100 nm, wherein the carrier contains nickel ferrite as a component; and
surface modifying the carrier, wherein a decolorant is stacked upon and grafted onto nickel atoms of the carrier and extends outwardly in a parallel manner to form a solid carbon fiber tube, wherein the degradation agent comprising an ionic liquid, and the degradation agent is grafted onto iron atoms of the carrier, so as to obtain the ionic liquid catalyst as claimed in claim 1.

7. The method according to claim 6, wherein the decolorant is grafted onto the nickel atoms of the carrier to obtain a composite powder material, and then the degradation agent is grafted onto the iron atoms of the carrier, so as to obtain the ionic liquid catalyst.

8. The method according to claim 7, wherein steps of grafting the decolorant include: introducing carbon dioxide at a temperature from 400° C. to 800° C., and reducing and grafting the carbon dioxide onto the nickel atoms of the carrier, so as to obtain a composite powder material.

9. The method according to claim 8, wherein the composite powder material is thermally treated at a temperature from 500° C. to 800° C.

10. The method according to claim 7, wherein a siloxane is grafted onto the iron atoms of the carrier to form a bridging structure, and then the ionic liquid reacts with the bridging structure, so that the ionic liquid is grafted onto the iron atoms of the carrier through the bridging structure.

11. The method according to claim 7, wherein the ionic liquid reacts with a siloxane to form an intermediate, and then the intermediate reacts with the carrier, so that the ionic liquid is grafted onto the iron atoms of the carrier through the siloxane.

* * * * *